Mar. 3, 1925. 1,528,692

W. RICHARDSON ET AL

INTERCHANGEABLE DOUBLE TOOTH FOR LOADERS

Filed May 23, 1922

INVENTORS
WILLIAM RICHARDSON
GEORGE AITKEN 2nd
BY Featherstonhaugh
ATTYS.

Patented Mar. 3, 1925.

1,528,692

UNITED STATES PATENT OFFICE.

WILLIAM RICHARDSON, OF MOOSE JAW, AND GEORGE AITKEN, OF REGINA, SASKATCHEWAN, CANADA.

INTERCHANGEABLE DOUBLE TOOTH FOR LOADERS.

Application filed May 23, 1922. Serial No. 563,172.

*To all whom it may concern:*

Be it known that we, WILLIAM RICHARDSON and GEORGE AITKEN, subjects of the King of Great Britain, and residents of the city of Moose Jaw and city of Regina, respectively, in the Province of Saskatchewan, Dominion of Canada, have invented certain new and useful Improvements in Interchangeable Double Teeth for Loaders, of which the following is a specification.

This invention relates to interchangeable double teeth for loaders, especially those used on the pick-up of a sheaf-loading machine, or an elevating machine, and has for its objects to provide an improved tooth approximately S-shaped and having a shank square in cross section and formed with a circular-threaded extension designed to engage a clamp nut by means of which it is secured to the rod of the frame on which it is carried.

Further objects are to provide a shank having at each end thereof a pointed extension curved in opposite directions to each other.

Still further objects are to provide a metallic rod on the frame designed to carry the tooth and having a square orifice registering with a round orifice through which the shank of the tooth is designed to extend and retained therein by means of a clamp nut.

Further objects are to provide an improved interchangeable tooth that is simple in construction, not liable to go out of repair, and generally to adapt the several parts to better perform the functions required of them.

With the above and other objects in view, the invention consists essentially of the improved construction, hereinafter described in detail in the accompanying specification and drawings.

In the drawings.

In the drawings, like characters of reference indicate corresponding parts in all the figures.

Figure 1:
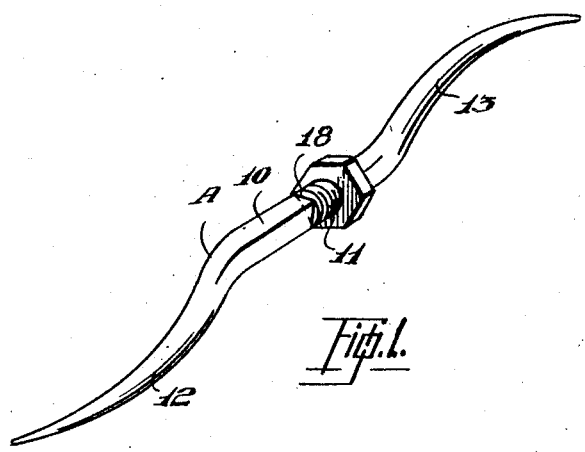
Figure 1 is a perspective view of the improved interchangeable tooth.
Figure 2:
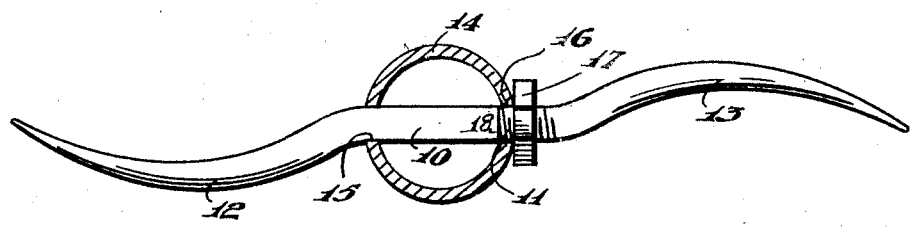
Figure 2 is a side elevation of the same, showing the supporting metallic rod in cross section.
Figure 3:
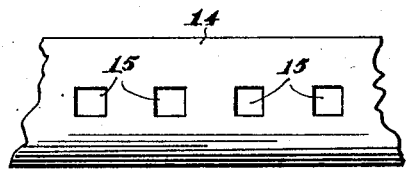
Figure 3 is a detail view of one supporting rod with the teeth removed to show the square holes.

Referring to the drawings, A represents the improved device comprising a shank 10 which is square in cross section and formed with a circular threaded extension 11. One end of the shank 10 is formed integral with a pointed curved extension 12, while the projection 11 is formed integral with a pointed extension 13, which forms a curve being the reverse of the curve described by the extension 12.

As is well known on an elevator or sheaf loader, the drum or other element carrying the teeth is formed with a plurality of longitudinal members by which the teeth are carried. In this case the longitudinal members consist of tubular metallic rods 14 which are provided with a plurality of square orifices 15, each registering with a round orifice 16. The square shank 10 of the device is designed to extend through the square orifice 15, while the circular threaded extension 11 extends through the round orifice 16 and the double tooth is securely held in position by means of a clamp nut 17 engaging the threaded projection 11 designed to be tightened against the tubular rod 14.

The double tooth is securely held on the rod since the square shank 10 will be unable to extend through the round orifice 16, and the rod 14 will be forced by the nut 17 against the shoulders 18 formed by the corners on the square shank.

When in use it is obvious that on the rod 14 being rotated, one of the arms or curved extensions 12 or 13 will pick up the sheaf or hay or whatever is to be elevated, and on being turned through the action of the rod 14 will throw its bundle or sheaf onto the elevator, while the opposite arm or curved extension now extending beneath the rod 14 will pick up a second bundle and by means of the same circular operation bring it upwards and throw it onto the elevator.

It is obvious from the foregoing that the new tooth will be very efficient in use and performs the function of a double tooth, one of the arms picking up a bundle of hay or straw, while the other arm integral with the first one throws a second bundle onto the elevator.

As many changes could be made in the above construction, and many apparently widely different embodiments of our invention, within the scope of the claims, constructed without departing from the spirit or scope thereof, it is intended that all matter contained in the accompanying specification and drawings shall be interpreted as illustrative and not in a limiting sense.

What we claim as our invention is:

1. A double tooth of the class described, comprising a shank square in cross section, a round threaded portion, a shoulder formed at the junction of the shank and threaded portion, a supporting member, pointed extensions at each end of the shank, and means in combination with the shoulder and threaded portion for securing the whole on the supporting member.

2. A double tooth of the class described, comprising a shank square in cross section, a round threaded portion, a shoulder formed at the junction of the shank and threaded portion, a supporting member, pointed extensions at each end of the shank curved in opposite directions, and a clamp nut in combination with the threaded portion and the shoulder, for securing the device on the supporting member.

3. A double tooth in combination with a tubular supporting member having a square and a round orifice registering with each other, comprising a shank square in cross section and extending through the square orifice, a round threaded portion extending through the round orifice, a shoulder at the junction of the shank and threaded portion, engaging the inner wall of the supporting member, extensions on both ends of the shank, curved in opposite directions, and a clamp nut engaging the threaded portion of the shank in order to retain the same on the supporting member.

In witness whereof we have hereunto set our hands in the presence of two witnesses.

WILLIAM RICHARDSON.
GEORGE AITKEN.

Witnesses as to William Richardson:
  HOWARD D. WILSON,
  ROBERT CHRISTIE.

Witnesses as to George Aitken:
  FRANK AST,
  ROBERT CHRISTIE.